March 24, 1925.

F. W. HALL 1,530,493

APPARATUS FOR PRODUCING ALUMINUM CHLORIDE

Filed March 15, 1920  3 Sheets-Sheet 1

Inventor
Frank W. Hall
By his Attorney

March 24, 1925. 1,530,493
F. W. HALL
APPARATUS FOR PRODUCING ALUMINUM CHLORIDE
Filed March 15, 1920 3 Sheets-Sheet 2
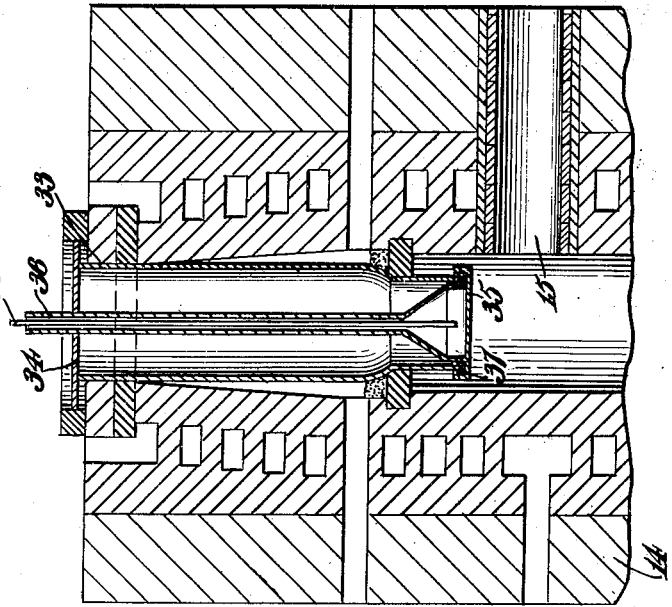
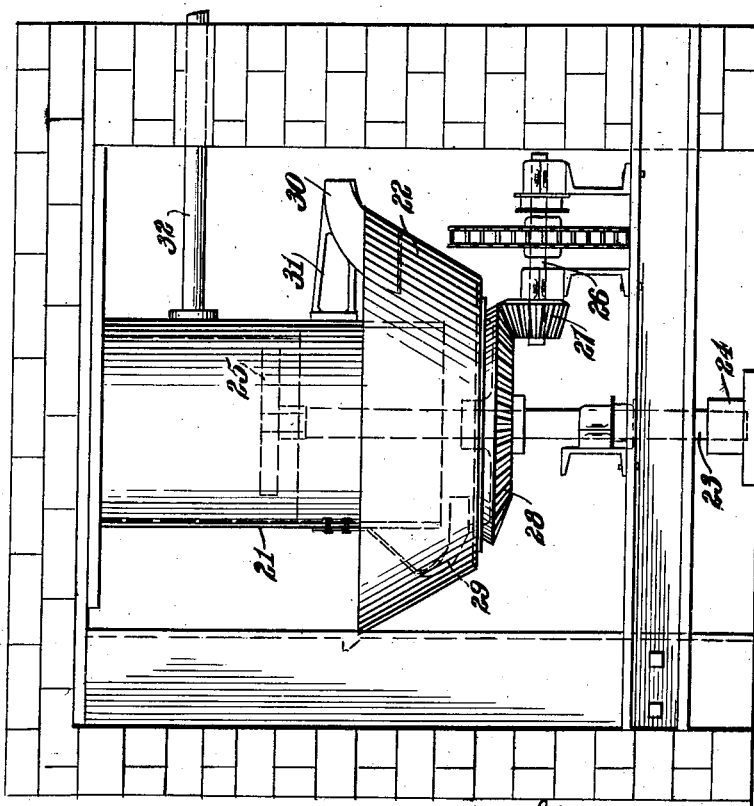
Inventor
Frank W. Hall
By his Attorney

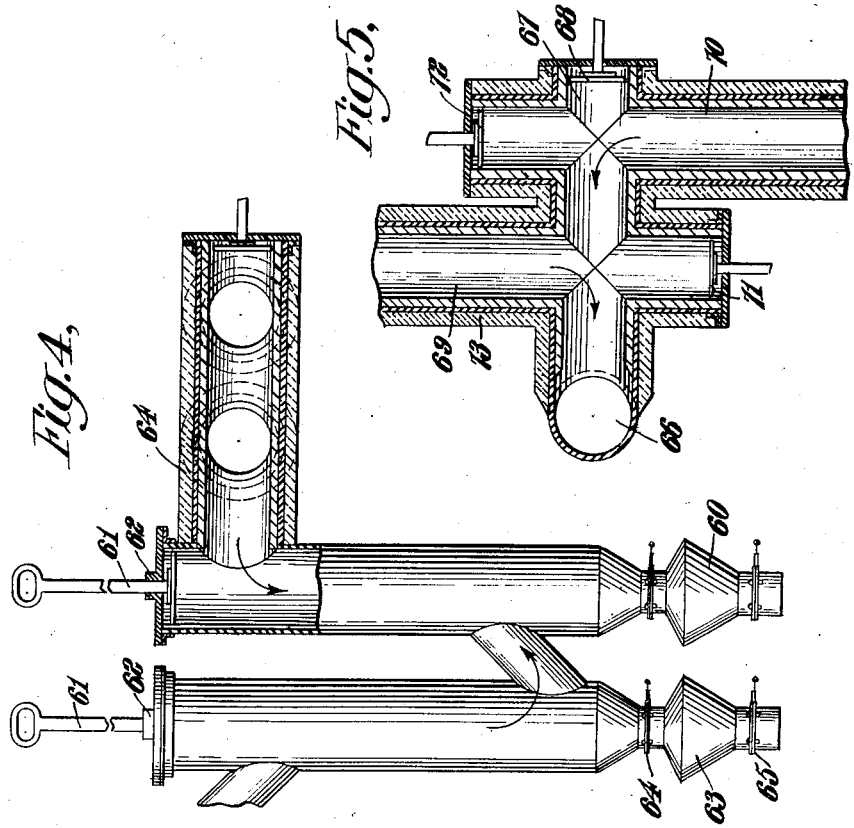

Patented Mar. 24, 1925.

1,530,493

UNITED STATES PATENT OFFICE.

FRANK W. HALL, OF PORT ARTHUR, TEXAS, ASSIGNOR TO THE TEXAS COMPANY, OF NEW YORK, N. Y., A CORPORATION OF TEXAS.

APPARATUS FOR PRODUCING ALUMINUM CHLORIDE.

Application filed March 15, 1920. Serial No. 365,860.

*To all whom it may concern:*

Be it known that I, FRANK W. HALL, a citizen of the United States, and a residen of Port Arthur, county of Jefferson, and State of Texas, have invented certain new and useful Improvements in Apparatus for Producing Aluminum Chloride, of which the following is a specification, reference being had to the accompanying drawings, forming a part thereof.

My invention relates to the manufacture of anhydrous aluminum chloride and has special reference to apparatus for the production of the same in relatively large quantities.

One object of my invention is to provide a retort particularly adapted for continuously chlorinating a coked mixture of alumina and carbon and adapted to be maintained at a high temperature.

Another object of my invention is to provide an apparatus particularly arranged for continuously producing anhydrous aluminum chloride suitable for use in the treatment and cracking of oils.

In order that my invention may be thoroughly understood I will now proceed to describe the same in the following specification, the novel features thereof being pointed out in the appended claims.

Referring to the drawings:

Figure 2 is a sectional plan of the retort which forms a part of the Figure 1 apparatus, drawn to a larger scale.

Figure 3 shows a section of the condenser of Figure 1 on a larger scale in section.

Figure 4 is a partially sectional elevation of a modified condenser which may be substituted for the condenser shown in Figure 1.

Figure 5 is a sectional detail showing suitable connections to the condenser from a pair of retorts.

Figure 6 is a sectional plan of the retort which forms a part of the Figure 1 apparatus drawn to a larger scale and illustrating the charging mechanism for the retort.

Figure 1:
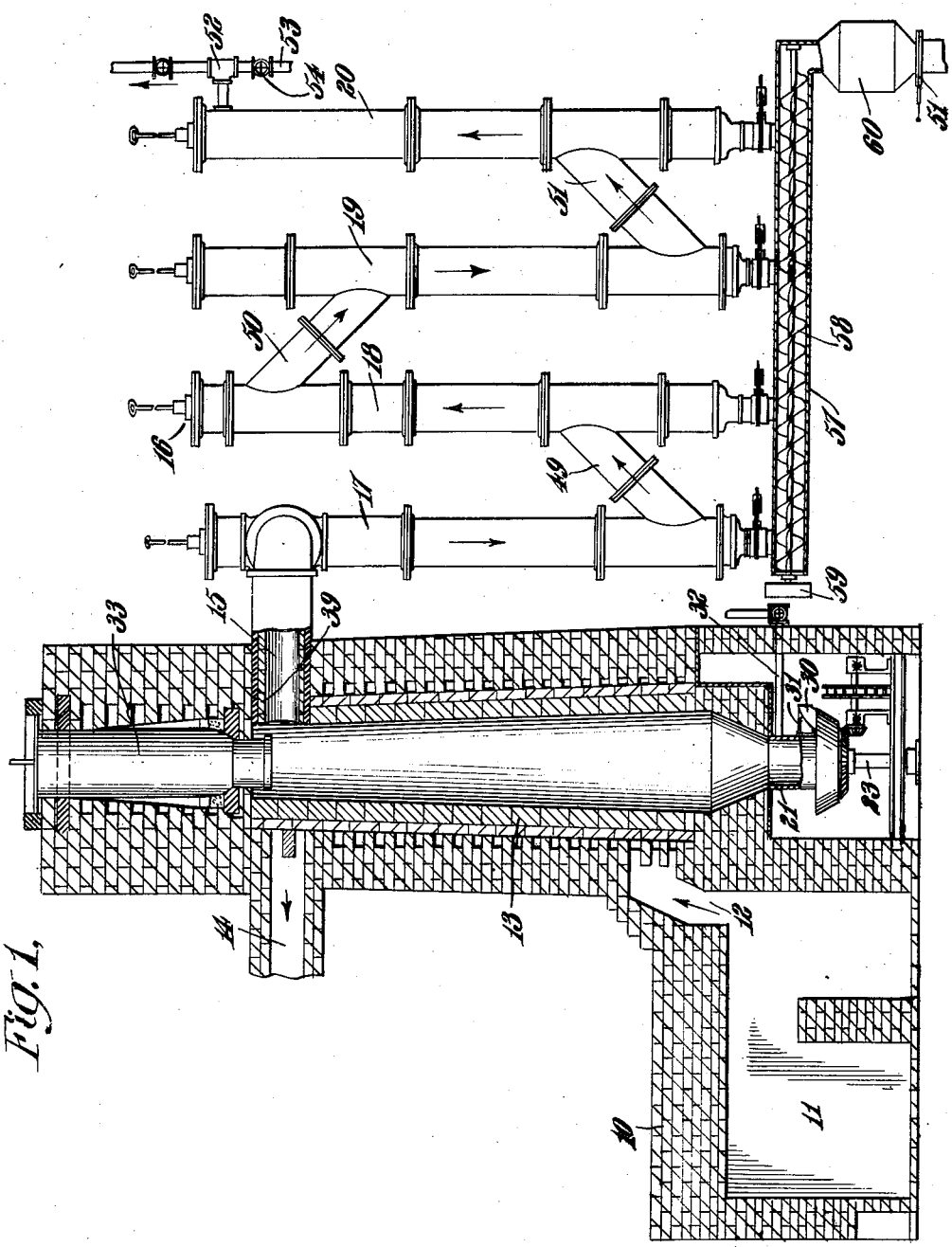
Figure 1 is a partially sectional elevation of an apparatus adapted for the aforesaid purpose and arranged and constructed in accordance with my invention.

Special reference must first be had to Figures 1, 2, and 3 in which 10 represents a furnace having a combustion chamber 11 from with the hot gases pass through the flue 12 around the retort 13 and out through a flue 14. The retort is provided at the top with a vapor outlet passage 15 through which the aluminum chloride vapors generated in the retort escape into a condenser 16 comprising a plurality of sections 17, 18, 19, and 20.

The retort at the bottom has a cylindrical extension 21 which terminates within a rotary pan 22 as clearly shown in sectional detail of Figure 2. The pan is supported by means of a rod 23, journaled at 24 and extending through the pan so as to support the perforated grate 25. The pan is rotated through the shaft 26 and pinion 27 which meshes with a gear wheel 28 on the bottom of the pan. The grate 25 operates to support the material in the retort while it is being subjected to the chlorination treatment allowing the ash or finer particles to drop into the pan 22. Thus the ash or spent material is continuously working out of the retort and discharging into the rotating pan where the accumulated ash forms a seal which prevents the exit of vapors and gases from the retort. The discharge of the ash into the pan is accelerated by means of the scraper 29 which is rigidly secured to the extension 21 and which serves to remove the ash from the mouth of the extension and conduct it into the path of the stationary plow or scraper 30 which is mounted on the bracket or arm 31. The plow 30 is arranged to scrape the ash only to a given depth so that while the excess ash may be pushed over the rim of the pan the ash required for the maintenance of the seal will not be disturbed. In this way the rotation of the pan causes the spent reaction materials to be continuously discharged from the retort while at the same time a gas-tight seal is maintained in the discharge apparatus by means of these same materials.

The retort is equipped with the gas inlet 32 for admitting chlorin or other gas used in the reaction.

The materials to be chlorinated are fed into the retort through a combined preheater and hopper 33 which is preferably arranged to be heated in order that the charge may be preheated before it is admitted to the retort. In the arrangement illustrated the hopper is placed outside the direct current of furnace gases but is so positioned that it will receive the heat of radiation from the furnace. The materials are admitted into the hopper 33 through the lid 34 and the admission of the charge to the retort is controlled by the bell valve 35 operated by the rod 36. The valve 35 is cone shaped and at the base at the point of contact with the bottom of the hopper 33 contains an annular groove 37. When the materials in the hopper are discharged into the retort some of the finer grain materials will lodge in the groove 37 forming a sealing material so that when the valve is closed by moving it upward, and thus causing the bottom of the hopper 33 to enter the groove, a tight closure is made which prevents the escape of vapors and gases from the retort.

While it is advantageous to preheat the charge in the hopper 33 it is also desirable in order to maintain the valve 35 in proper working condition that this valve should not be heated excessively. In order to keep the valve in a relatively cool condition a cooling system is preferably provided. This may be done by constructing the valve operating rod 36 in the form of a pipe containing within it a smaller pipe 38, these pipes terminating within the hollow valve member 35 and preferably extending within the cone to a point near its base, as illustrated. One pipe is connected to a suitable source of water, not shown, and the other pipe forms the water outlet, thus providing for a circulation of water through the hollow cone. The pipes 36 and 38 may conveniently terminate in a flexible hose, not shown, in order that the pipe 36 may be movable so to operate the valve 35, the pipes being held in position, when the valve is closed, in any convenient manner.

The vapor line 15 from the retort to the first section 17 of the condenser is preferably lined with tile as indicated at 39 to protect the iron pipe from the action of any excess chlorin which would be particularly active at this point due to the elevated temperature.

Each section of the condenser 16 consists of a vertical pipe or cylinder which may be built up of parts designated 17$^a$, 17$^b$, and 17$^c$, as clearly shown in Figure 3, having end flanges 40 so that they are securely fastened together by bolts 41. At the top of each section of the condenser is a lid 42 carrying a nut 43 through which a screw threaded scraper rod 44 extends. At its outer end this rod is formed into a handle 45 and within the cylidrical condenser section a scaper 46 is secured to the inner end of the rod. At the bottom of each condenser section is a discharge hopper 47 provided with an air tight gate 48. The condenser sections as clearly shown in Figure 1, are interconnected by inclined pipe sections so that the aluminum chloride vapors being condensed flow upwardly through an inclined pipe section 49, upwardly through the condenser section 18, downwardly through the pipe connection 50, downwardly through the condenser section 19, upwardly through an inclined pipe connection 51 and upwardly through the last section 20 of the condenser.

In order to prevent any back pressure of the vapors in the retort 13 it may be desired to create a suction through the condenser 16. This may be accomplished by means of a steam ejector 52 which is connected to the section 20 near the top and is supplied with steam through a pipe 53 having a control valve 54.

By making the condenser sections of iron all joints may readily be made air tight. This is quite an advantage in producing anhydrous aluminum chloride which is a very hygroscopic material.

The vapors are condensed in the form of a solid which either drops to the bottom of the sections or is deposited on the walls of the condenser. The scrapers are utilized for scraping the deposit from the walls and causing it to fall to the bottom of the apparatus. As clearly shown in Figure 3, an additional scraper 55 may be mounted in a T projection directly opposite the vapor line 15 and is arranged to be operated by a screw threaded rod 56 corresponding to the rod 44. When the scraper is not in use it closes the end of the projection, as shown in Figure 3.

As shown in Figure 1 the several sections of the condenser may discharge into a substantially horizontal passage or pipe 57 containing a screw conveyer 58 operated by a pulley 59 or suitable driving means. The passage discharges into an accumulating hopper 60 which is provided with a discharge valve 61.

If it is desired to withdraw the condensed product from each of the sections individually the connection 57, the screw conveyer 58, and the hopper 60 may be omitted but this arrangement when employed has the advantage of permitting the withdrawal of the condensed product from a single or final discharge opening.

Referring now to Figures 4 and 5 the arrangement here shown is a modification of the condenser shown in Figure 1. In this case the scraper rods 61 are not screw threaded but slide through bearings or stuffing boxes 62 in the top of the condenser sections. Instead of the hopper bottoms 47 the sections as here shown are each provided with a hopper 63 having a valve 64 at the top and a valve 65 at the bottom. With this arrangement it is possible to open the valve 64 thus permitting the aluminum chloride to accumulate in the hopper 63 and to close the valve 64 and open the valve 65 in order to remove the aluminum chloride without opening the condenser sections to the atmosphere.

A single condenser composed of a plurality of sections may be utilized for two or more retorts and the arrangement of the connections from two retorts is shown in the sectional detail of Figure 5. The adjacent section of the condenser is here designated as 66. The main connection leading into the condenser section is designated as 67. It is provided with a scraper 68. Branch connections 69 and 70 lead into the main connection 67 and the branch connections are respectively provided with scrapers 71 and 72. The main and branch connection from the retort from the first section of the condenser are preferably insulated or lagged in each case as shown in 73 so as to prevent as far as possible the condensation of the aluminum chloride in the connections where it will tend to clog the system.

By making the connections between condenser sections at an angle the aluminum chloride is largely prevented from settling in the passages and stopping the flow of the aluminum chloride vapors. By making the sections of the condenser of iron the heat is readily conducted through the walls and the vapors effectively and efficiently condensed. It is highly important to be able to withdraw products without stopping the continuous operation of the process and this is one of the results accomplished by the use of my invention.

The apparatus claimed herein may be utilized in the production of aluminum chloride by means of the reaction obtaining between almina, carbon and chlorin and is particularly adapted for conducting the process disclosed in my Patent 1,503,648.

In producing the chloride by means of the apparatus described herein the alumina-carbon mixture (which may have been previously coked), or other materials that it is desired to use, are admitted to the hopper 33 where they are preferably preheated so that when discharged into the retort they are in a heated state thus reducing the amount of heat required to be applied to the retort to raise them to reaction temperatures and lessening the time needed to hold them in the retort, thereby effecting not only a heat economy but materially speeding up the process. The chlorin or other gas needed for the reaction is admitted through the gas inlet 32.

The solid materials to be treated are frequently admitted in the form of briquets, although this is not always required as is pointed out in the Patent 1,503,648 above referred to which covers a process of manufacture not requiring the briquetting of the alumina-carbon mixture. But whether introduced in the form of briquets or not the material is ordinarily charged into the retort in a more or less coarse form so that it may be held in the retort by means of the grate 25.

As the reaction progresses the aulmina-carbon particles are disintegrated and reduced to an ash in a more or less powdered condition so that it readily passes through the grate and into the rotating pan 22. The spent ash settling in the pan forms a gas-tight seal while the excess ash is discharged from the pan by means of the plow 29. As the materials in the retort are used up in the reaction fresh, preheated materials are added from the hopper 33 as needed. The aluminum chloride vapors produced in the retort pass to the condenser where the product is collected and removed from the apparatus without interrupting the continuity of the process as has been hereinbefore explained.

Structures of preferred form and construction have been illustrated and described for the purpose of showing a way in which this invention may be used, but the inventive thought upon which this application is based, is broader than these illustrative embodiments thereof, and I therefore intend no limitations other than those imposed by the appended claims.

What I claim is:

1. In apparatus for the manufacture of aluminum chloride, a retort adapted to receive materials to be employed in making said chloride, an outlet for said retort and means for maintaining a quantity of ash about said outlet so as to form a seal therein.

2. In apparatus for the manufacture of aulminum chloride, a retort adapted to receive materials to be employed in making said chloride, an outlet for said retort, means for maintaining a quantity of ash about said outlet so as to form a seal therein and means for continuously withdrawing excess ash.

3. Apparatus for the manufacture of aluminum chloride comprising a retort, means for feeding an alumina-carbon mixture into said retort at the top, means for introducing a chlorinating agent to the retort, an outlet at the bottom of the retort and means for permitting the accumulation of fine spent material about said outlet.

4. Apparatus for the manufacture of aluminum chloride comprising a retort, means for feeding material into the retort, means for introducing gas to the retort and means for continuously withdrawing spent material from the retort through a gas tight seal comprising a portion of said spent material maintained in a plane above the bottom of the retort and external thereto.

5. In apparatus for the manufacture of aluminum chloride, a retort adapted to receive materials to be employed in making said chloride, an outlet at the bottom of the said retort and means for maintaining a quantity of ash outside of and above said outlet so as to form a seal therefor.

6. Apparatus for continuously producing aluminum chloride comprising a retort, means for admitting relatively coarse reaction materials to the retort, means for supporting said materials in the retort while permitting material disintegrated by the reaction to pass to the bottom of the retort, an outlet at the bottom of the retort, means for accumulating spent materials about the outlet to form a seal therefor, and means for continuously discharging the excess of said spent materials not needed for maintaining said seal.

7. Apparatus for continuously producing aluminum chloride comprising a retort, means for admitting relatively coarse reaction materials to the retort, a grate for supporting said materials in the retort while permitting material disintegrated by the reaction to pass to the bottom of the retort, means for rotating the grate and pan and a scraper adapted to remove spent materials at the bottom of the retort, means for rotating the grate and pan and a scraper adapted to remove spent materials from the pan to a predetermined depth.

8. Apparatus for continuously producing aluminum chloride comprising a retort, means for admitting chlorin to the retort, means for admitting relatively coarse reaction materials to the retort, a grate for supporting said materials until decomposed into finer spent materials by the reaction, an outlet at the bottom of the retort, a pan at the bottom of the retort adapted to receive spent materials from said outlet and having a diameter greater than that of the retort, the walls of said pan extending above the bottom of the retort and means for removing spent materials from the pan to a predetermined depth above the bottom of the retort.

9. A combined gas tight seal and outlet for retorts comprising an open retort bottom, means beneath the retort bottom for receiving spent materials from the retort and maintaining a portion of them in a plane above but external to the bottom of the retort and means for removing spent materials from the receiving means.

10. A combined gas tight seal and outlet for retorts comprising an open retort bottom, means beneath the retort bottom for receiving spent materials from the retort and maintaining a mass of said spent materials outside the retort about the bottom thereof to form a gas tight seal and means for removing spent materials from the receiving means.

11. A combined gas tight seal and outlet for retorts having an opening at the bottom comprising means for maintaining spent materials from the retort in a plane above but external to the retort bottom to constitute the seal and means for withdrawing excess spent material not needed for said seal.

12. A combined gas tight seal and outlet for retorts having an opening at the bottom comprising means for maintaining spent materials from the retort in a plane above but external to the retort bottom to constitute the seal and means for withdrawing spent materials from the retort bottom through said seal at a rate corresponding to the rate of accumulation of spent materials at the retort bottom.

13. A combined gas tight seal and outlet for retorts having an opening at the bottom comprising means for maintaining spent materials from the retort in a plane of predetermined height above but external to the retort bottom to constitute the seal and means for continuously withdrawing spent materials from the retort bottom through said seal.

14. A combined gas tight seal and outlet for retorts having an opening at the bottom comprising a rotary receptacle beneath the retort bottom but whose sides extend above the latter to form a seal of spent materials collected from the retort and means for removing from the receptacle spent materials in excess of the amount necessary to maintain said seal.

15. A combined gas tight seal and outlet for retorts comprising an open retort bottom, a circular upright pan having sides extending upwardly above the retort bottom for receiving spent materials therefrom, a journalled shaft to rotate the pan and scrapers rigidly secured to the retort for pushing the excess spent material over the edges of the pan by its rotation.

In witness whereof I have hereunto set my hand this 18th day of February, 1920.

FRANK W. HALL.